(12) United States Patent
Zhang et al.

(10) Patent No.: US 9,934,810 B2
(45) Date of Patent: Apr. 3, 2018

(54) MAGNETIC RECORDING MEDIUM AND MAGNETIC STORAGE APPARATUS

(71) Applicant: SHOWA DENKO K.K., Tokyo (JP)

(72) Inventors: Lei Zhang, Chiba (JP); Tetsuya Kanbe, Chiba (JP); Yuji Murakami, Chiba (JP); Kazuya Niwa, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 545 days.

(21) Appl. No.: 14/220,332

(22) Filed: Mar. 20, 2014

(65) Prior Publication Data

US 2014/0308542 A1    Oct. 16, 2014

(30) Foreign Application Priority Data

Apr. 12, 2013  (JP) ................. 2013-084285
Jun. 13, 2013  (JP) ................. 2013-124791

(51) Int. Cl.
*G11B 5/66* (2006.01)
*G11B 5/73* (2006.01)

(52) U.S. Cl.
CPC .............. *G11B 5/73* (2013.01); *G11B 5/7325* (2013.01)

(58) Field of Classification Search
CPC ................................ G11B 5/73; G11B 5/7325
See application file for complete search history.

(56) References Cited

U.S. PATENT DOCUMENTS

| 6,068,739 | A | 5/2000 | Suzuki et al. | |
|---|---|---|---|---|
| 2004/0214049 | A1 | 10/2004 | Yamamoto et al. | |
| 2005/0142389 | A1* | 6/2005 | Hinoue et al. | 428/694 TS |
| 2007/0122659 | A1* | 5/2007 | Osawa et al. | 428/831 |
| 2008/0311430 | A1* | 12/2008 | Chen et al. | 428/827 |
| 2009/0239100 | A1* | 9/2009 | Watanabe | 428/828 |
| 2011/0235479 | A1* | 9/2011 | Kanbe et al. | 369/13.32 |
| 2012/0113768 | A1 | 5/2012 | Kanbe et al. | |
| 2012/0141835 | A1* | 6/2012 | Sakamoto | 428/831 |

FOREIGN PATENT DOCUMENTS

| CN | 102473420 | 5/2012 |
|---|---|---|
| JP | 11-353648 | 12/1999 |
| JP | 2004-326889 | 11/2004 |
| JP | 2009-158054 | 7/2009 |
| JP | 2012-48792 | 3/2012 |

OTHER PUBLICATIONS

En Yang et al., L1oFePt-oxide columnar perpendicular media with high coercivity and small grain size, J.Appl. Phys. 104, 023904, 2008.

* cited by examiner

*Primary Examiner* — Holly Rickman
*Assistant Examiner* — Linda Chau
(74) *Attorney, Agent, or Firm* — IPUSA, PLLC

(57) ABSTRACT

A magnetic recording medium includes a substrate, multiple underlayers formed on the substrate, and a magnetic layer formed on the multiple underlayers. A main component of the magnetic layer is an alloy having a $L1_0$ structure. At least one of the multiple underlayers is a crystalline underlayer containing W. The W is a main component of the crystalline underlayer. The crystalline underlayer further contains 1 mol % or more to 20 mol % or less of one or more kinds of elements selected from B, Si, and C. A barrier layer including a material having a NaCl structure is formed between the crystalline underlayer and the magnetic layer.

5 Claims, 3 Drawing Sheets

MAGNETIC RECORDING MEDIUM AND MAGNETIC STORAGE APPARATUS

CROSS-REFERENCE TO RELATED APPLICATIONS

This application is based upon and claims the benefit of priority of the prior Japanese Patent Application Nos. 2013-084285 and 2013-124791 filed on Apr. 12, 2013 and Jun. 13, 2013, respectively, the entire contents of which are incorporated herein by reference.

BACKGROUND OF THE INVENTION

1. Field of the Invention

The present invention relates to a magnetic recording medium and a magnetic storage apparatus.

2. Description of the Related Art

In recent years, the demand for increasing capacity of a HDD (Hard Disk Drive) has been growing. In order to satisfy this demand, there is proposed a thermally assisted magnetic recording method that performs recording by heating a magnetic recording medium with a magnetic head having a laser source mounted thereon.

With the thermally assisted magnetic recording method, coercivity (coercive force) of a magnetic recording medium is significantly decreased by heating the magnetic recording medium. Therefore, a material having high magnetic anisotropy constant Ku can be used for a magnetic layer of the magnetic recording medium. Thus, size reduction of magnetic particles of the magnetic recording medium can be achieved while maintaining thermal stability. Accordingly, an area density in a class of 1 Tbit/inch$^2$ can be attained. As an example of the material having high magnetic anisotropy constant Ku, there is proposed an ordered alloy such as an $L1_0$ type FePt alloy, an $L1_0$ type CoPt alloy, and an $L1_1$ type CoPt alloy.

Furthermore, in order to isolate crystal particles of the aforementioned alloys, an oxide (e.g., $SiO_2$, $TiO_2$), carbon (C), or Boron Nitride (BN) may be added to the magnetic layer as a grain boundary phase material. Owing to a granular structure having magnetic crystal particles separated at a grain boundary phase, exchange coupling between magnetic particles can be reduced. Thereby, a medium having high SN ratio can be obtained.

A non-patent document (J. Appl. Phys. 104, 023904, 2008) discloses that a magnetic particle diameter can be reduced to 5 nm by adding 38% of $SiO_2$ to FePt. Further, the non-patent document also discloses that a magnetic particle diameter can be reduced to 2.9 nm by increasing the addition amount of $SiO_2$ to 50%.

In order to fabricate a thermally assisted magnetic recording medium having high magnetic anisotropy, it is preferable for an $L1_0$ type ordered alloy inside the magnetic layer to have a satisfactory (001) orientation. The orientation of the magnetic layer can be controlled in accordance with an underlayer. Therefore, in order to obtain the (001) orientation, an appropriate underlayer needs to be used.

For example, Japanese Laid-Open Patent Publication No. 11-353648 discloses a $L1_0$ type FePt magnetic layer exhibiting a satisfactory (001) orientation by using a MgO underlayer.

Further, Japanese Laid-Open Patent Publication No. 2009-158054 discloses a L10 type FePt magnetic layer exhibiting a further satisfactory (001) orientation by using a MgO underlayer (serving as both a crystal orientation control layer and a thermal conductive intermediate layer) formed on a crystal particle diameter control layer having a BCC (Body Centered Cubic) structure such as a Cr—Ti—B alloy.

Further, a practical example 2.3 of Japanese Laid-Open Patent Publication No. 2012-48792 discloses an example using W-5 at % Mo/Cr as an underlayer.

Alternatively, a microwave assisted magnetic recording method is drawing attention as a next generation recording method. The microwave assisted magnetic recording method records magnetic data by radiating a microwave onto a magnetic layer of a magnetic recording medium, tilting an axis of easy magnetization, and locally reversing magnetization of the magnetic recording layer.

Similar to the thermally assisted magnetic recording method, the microwave assisted magnetic recording method also can use a material having high magnetic anisotropy constant Ku for a magnetic layer of the magnetic recording medium. Therefore, size reduction of magnetic particles of the magnetic recording medium can be achieved while maintaining thermal stability.

In using the above-described magnetic storage apparatus that uses the thermally assisted magnetic recording method or the microwave assisted magnetic recording method, there is a demand for further reducing the size of magnetic crystal particles along with further sufficiently reducing coupling exchange between magnetic crystal particles, so that a medium having high SN ratio can be obtained. In order to satisfy this demand, it is effective to add $SiO_2$ or carbon (C) to the magnetic layer as a grain boundary phase material as described above.

However, if a large amount of grain boundary phase material is added for obtaining a medium having high SN ratio in a case of using the magnetic storage apparatus, a problem of reduction of magnetic anisotropy constant Ku due to degradation of the degree of order of magnetic layer crystal particles (crystal particles of alloy that are included in a magnetic layer and have an $L1_0$ structure) such as FePt alloy crystal particles.

SUMMARY OF THE INVENTION

The present invention may provide a magnetic recording medium and a magnetic storage apparatus that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a magnetic recording medium and a magnetic storage apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a magnetic recording medium including a substrate, multiple underlayers formed on the substrate, and a magnetic layer formed on the multiple underlayers. A main component of the magnetic layer is an alloy having a $L1_0$ structure. At least one of the multiple underlayers is a crystalline underlayer containing W. The W is a main component of the crystalline underlayer. The crystalline underlayer further contains 1 mol % or more to 20 mol % or less of one or more kinds of elements selected from B, Si, and C. A barrier layer including a material having a NaCl structure is formed between the crystalline underlayer and the magnetic layer.

DESCRIPTION OF THE PREFERRED EMBODIMENTS

First Embodiment

Figure 1:
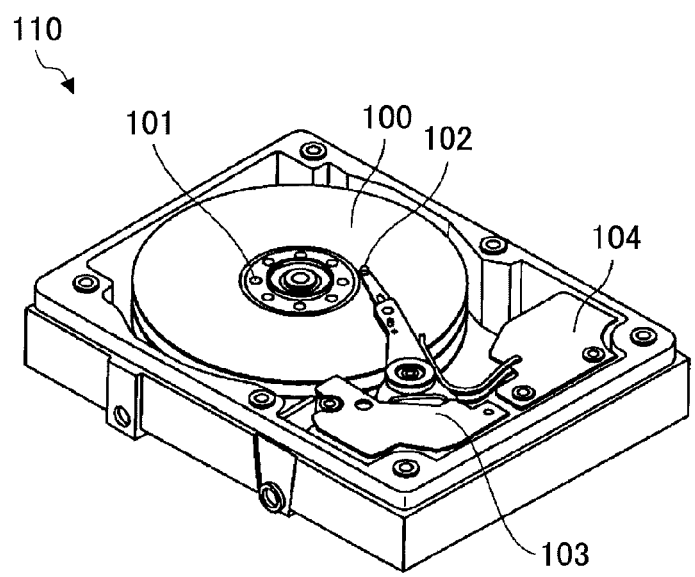
FIG. 1 is a schematic diagram illustrating a configuration of a magnetic storage apparatus according to an embodiment of the present invention.

An example of a configuration of a magnetic recording medium 100 according to a first embodiment of the present invention is described.

The magnetic recording medium 100 according to an embodiment of the present invention includes a substrate. The magnetic recording medium 100 also includes multiple underlayers and a magnetic layer that are formed on the substrate. The main component of the magnetic layer is an alloy having an $L1_0$ structure. At least one of the multiple underlayers is a crystalline underlayer containing W (tungsten).

The main component of the crystalline underlayer is W. In addition, the crystalline underlayer containing W includes 1 mol % or more to 20 mol % or less of one or more kinds of elements selected from B, Si, and C. Alternatively, the crystalline underlayer includes 1 vol % or more to 50 vol % or less of an oxide.

Further, a barrier layer is formed between the crystalline underlayer containing W and the magnetic layer. The barrier layer is formed of a material including a NaCl type structure.

First, the magnetic recording medium 100 including the substrate, the multiple underlayers formed on the substrate, and the magnetic layer is described in further detail.

The substrate is not limited to a particular material. Various types of substrates used for magnetic recording media may be used as the substrate of the magnetic recording medium 100.

Further, multiple underlayers are formed on the substrate. As described above, at least one of the multiple underlayers is a crystalline underlayer containing W.

The main component of the crystalline underlayer containing W is W. Further, the crystalline underlayer containing W also includes one or more elements selected from B, Si, and C. Alternatively, the crystalline underlayer containing W may also include an oxide. Although the oxide is not limited in particular, the oxide is preferably one or more of, for example, $B_2O_3$, $SiO_2$, $Cr_2O_3$, $Al_2O_3$, $Ta_2O_5$, $Nb_2O_5$, $ZrO_2$, $Y_2O_2$, $CeO_2$, $MnO$, $TiO_2$, $TiO$, $ZnO$, $La_2O_3$, $NiO$, $FeO$, and $CoO$.

In a case where the crystalline underlayer containing W includes one or more elements selected from B, Si, and C, the content (addition quantity) of the one or more elements selected from B, Si, and C is preferably 1 mol % or more to 20 mol % or less. This is because the orientation of the underlayer with respect to the (100) plane is degraded if the content (addition quantity) of the one or more elements selected from B, Si, and C is greater than 20 mol %. Further, the crystalline underlayer containing W cannot sufficiently function if the content (addition quantity) of the one or more elements selected from B, Si, and C is less than 1 mol %. Therefore, the content (addition quantity) of the one or more elements selected from B, Si, and C is preferred to fall within the range of 1 mol % or more to 20 mol % or less. It is particularly preferable for the content (addition quantity) of the one or more elements selected from B, Si, and C to be 5 mol % or more to 15 mol % or less.

In a case where the crystalline underlayer containing W includes an oxide, the content (addition quantity) of the oxide is preferably 1 vol % or more to 50 vol % or less.

This is because the orientation of the underlayer with respect to the (100) plane is degraded if the content (addition quantity) of the oxide is greater than 50 vol %. Further, the crystalline underlayer containing W cannot sufficiently function if the content (addition quantity) of the oxide is less than 1 vol %. Therefore, the content (addition quantity) of the oxide is preferred to fall within the range of 1 vol % or more to 50 vol % or less.

In a case where the crystalline underlayer containing W includes an oxide, the volume amount of the oxide (vol %) included in the crystalline underlayer containing W can be calculated from the mol concentration (mol %), the density r (g/cc), and the molecular mass (Mw) (g/mol) of each of the substances included in the crystalline underlayer containing W. For example, the density and molecular mass of the substances may be obtained by using the data written in "CRC Handbook of Chemistry and Physics". In a case of adding an oxide A to W (tungsten), the formula for obtaining the volume amount of oxide A included in W (vol %) can be expressed with the following Formula (1):

(Volume amount of Oxide $A$)=$\rho_W \cdot C_A \cdot M_A/(C_W M_W \rho_A + C_A M_A \rho_W)$ <Formula (1)>

In Formula (1), "$C_W$" indicates the mol concentration of W, "$\rho_W$" indicates the density of W, and "$M_W$" indicates the molecular mass of W. Further, in Formula (1), "$C_A$" indicates the mol concentration of the oxide A, "$\rho_A$" indicates the density of the oxide A, and "$M_A$" indicates the molecular mass of the oxide A.

For example, in a case of adding 10 mol % of $Cr_2O_3$ to W, the volume amount of $Cr_2O_3$ calculated by using the Formula (1) is 25.4 vol %. Further, in a case of using a crystalline underlayer containing W that is analyzed as including 10 mol % of $Cr_2O_3$ according to EDS (Energy Dispersive X-ray Spectrometry), the volume amount of $Cr_2O_3$ observed by performing plan-view TEM (Transmission Electron Microscopy) observation on the crystalline underlayer is approximately 24 vol %. Therefore, theoretically, the calculated volume amount of $Cr_2O_3$ is substantially equivalent to the observed volume amount of $Cr_2O_3$.

The magnetic layer including the crystal particles (e.g., FePt alloy having $L1_0$ structure) is formed on the underlayer. Thus, in a case where the diameters of the crystal particles of the underlayer are large, multiple crystal particles of alloy having the $L1_0$ structure grow on a single crystal particle of the underlayer. Therefore, conventionally, the particle diameters of each of the crystal particles of the alloy having the $L1_0$ structure of the magnetic layer become uneven. This causes an increase in the variance of the particle diameters of the crystal particles of the alloy having the $L1_0$ structure. However, with the magnetic recording medium 100 according to an embodiment of the present invention, the particle diameter of the crystal particles of the underlayer can be reduced by providing the crystalline underlayer containing W. "One to one growth" (i.e., a single crystal particle of the magnetic layer grown on a single crystal particle of the underlayer) can be facilitated by reducing the particle diameter of the crystal particles of the underlayer. Thereby, the particle diameters of each of the crystal particles of the alloy having the $L1_0$ structure of the magnetic layer become uniform (even). In other words, the variance of the particle diameters of the crystal particles of the alloy having the $L1_0$ structure can be reduced. In addition, in a case where the magnetic recording medium 100 is applied to a magnetic storage apparatus, the SN ratio of the magnetic recording medium 100 can be improved. By providing the crystalline underlayer containing W in the magnetic recording medium 100 according to an embodiment of the present invention, the variance of coercivity can be reduced. This facilitates separation between the crystal particles of the magnetic layer and reduces exchange coupling of the crystal particles of the magnetic layer. Further, SFD (Switching Field Distribution) can also be reduced.

Although the amount of W of the crystalline underlayer containing W is not limited in particular, W is preferred to be added, so that W becomes the main component of the underlayer. For example, W is to be an element having a largest amount within a W compound excluding B, Si, C or an oxide or a material having another element doped with W. In a case of a W compound excluding B, Si, C, or an oxide, the W-content (amount) contained in the W compound is preferably 30 at % or more, and more preferably 90 at % or more. It is to be noted that W is not limited to a single element and may be a W compound or a material having another element doped with W.

Further, in order to stabilize the performance of the magnetic recording medium 100, the lattice misfit between the multiple underlayers is preferably 10% or less. In order to adjust the lattice misfit, the crystalline underlayer containing W may further contain one or more elements selected from Cr, Ti, Ta, Nb, and V. In a case where one or more elements selected from Cr, Ti, Ta, Nb, and V is contained in the crystalline underlayer containing W, the content (amount) of one or more elements selected from Cr, Ti, Ta, Nb, and V is not limited in particular. The amount of adding the one or more elements selected from Cr, Ti, Ta, Nb, and V may be selected to enable control of the lattice misfit.

In order to ensure that the crystalline underlayer containing W attains a (100) orientation, it is preferable to form an orientation control underlayer below the crystalline underlayer containing W. Although the material of the orientation control underlayer is not limited in particular, the material of the orientation control underlayer is preferably one or more types of metal selected from Cr (Cr metal), an alloy having a BCC structure and including Cr as a main component, and an alloy having a B2 structure. In this case where the material of the orientation control underlayer is one or more types of metal selected from Cr (Cr metal), an alloy having a BCC structure and including Cr as a main component, and an alloy having a B2 structure, the crystalline underlayer containing W is preferred to be formed on the orientation control underlayer formed of one or more types of metal selected from Cr (Cr metal), an alloy having a BCC structure and including Cr as a main component, and an alloy having a B2 structure.

The alloy having a BCC structure and including Cr as a main component may be, for example, CrMn, CrMo, CrW, CrV, CrTi, or CrRu. In a case where the orientation control underlayer is formed of Cr or an alloy having a BCC structure and including Cr as a main component, it is possible to improve, for example, the size or the variance of the crystal particles of the crystalline underlayer containing W by further adding an element such as B, Si, or C. However, in the case of adding the element such as B, Si, or C, the element is to be added to the extent of not degrading the (100) orientation of the orientation control underlayer itself.

Further, the alloy having a B2 structure may be, for example, RuAl or NiAl.

Next, the magnetic layer is described.

Although the material of the magnetic layer is not limited in particular, a main component of the magnetic layer is preferably an alloy having a $L1_0$ structure because the alloy having a $L1_0$ structure has a high magnetic anisotropy constant Ku. The alloy having a $L1_0$ structure may be, for example, a FePt alloy or a CoPt alloy.

As described above, in order to promote ordering of the magnetic layer, it is preferable to perform a heating process when forming the magnetic layer. In order to lower the heating temperature (ordering temperature) during this heating process, an element such as Ag, Au, Cu, Ni may be added to the alloy having the $L1_0$ structure. By adding such element, the heating temperature (substrate temperature) during the forming of the magnetic layer can be lowered to approximately 400° C. to 500° C.

Further, it is preferable for the crystal particles of the alloy having the $L1_0$ structure to be magnetically isolated in the magnetic layer. Therefore, the magnetic layer is preferred to include one or more kinds of elements selected from $SiO_2$, $Cr_2O_3$, $Al_2O_3$, $Ta_2O_5$, $ZrO_2$, $Y_2O_3$, $CeO_2$, MnO, TiO, ZnO, $B_2O_3$, C, B, and BN. Thereby, exchange coupling between crystal particles can be more positively divided. Thus, the SN ratio of the magnetic recording medium 100 can be further increased.

In manufacturing the magnetic recording medium 100 of this embodiment, a heating process is preferred to be performed on a substrate at approximately 600° C. during the forming of the magnetic layer, so that ordering of the magnetic layer having the $L1_0$ structure can be promoted. In order to prevent interfacial diffusion between the underlayer and the magnetic layer, it is preferable to form a barrier layer between the crystalline underlayer containing W and the magnetic layer. The barrier layer is formed of, for example, a material including a NaCl type structure.

Although the material including a NaCl type structure is not limited in particular, the material is preferred to include one or more kinds of elements selected from MgO, TiO, NiO, TiN, TiC, TaN, HfN, NbN, ZrC, Hf c, TaC, and NbC.

Although the configuration of the magnetic recording medium 100 according to an embodiment of the present invention has been described above, various components/members may also be arbitrarily provided in the configuration of the magnetic recording medium 100 as described below.

For example, a DLC (Diamond-Like Carbon) protection film is preferred to be formed on the magnetic layer.

The method for manufacturing the DLC protection film is not limited in particular. For example, the DLC protection film may be formed by using a RF-CVD method in which a film is formed by decomposing a raw material gas formed of carbon hydrogen with a high frequency plasma. Alternatively, the DLC protection film may be formed by using a IBD (Ion Beam Deposition) method in which a film is formed by ionizing a raw material gas with electrons emitted from a filament. Alternatively, the DLC protection film may be formed by using a FCVA (Filtered Cathodic Vacuum Arc) method in which a film is formed by using a solid C target without using a raw material gas.

Although the thickness of the DLC protection film is not limited in particular, the thickness of the DLC protection film is preferably, for example, 1 nm or more to 6 nm or less. The thickness of the DLC protection film is preferred not to be less than 1 nm because the floating property of the magnetic head may be degraded if the thickness of the DLC protection film is less than 1 nm. Further, the thickness of the DLC protection film is preferred not to be greater than 6 nm because magnetic spacing is increased and the SN ratio of the magnetic recording medium is degraded if the thickness of the DLC protection film is greater than 6 nm.

Further, a lubricant formed of a perfluoropolyether type fluororesin may be applied to the DLC protection film.

Further, a heat sink layer is preferred to be formed for rapidly cooling the magnetic layer. For example, the heat sink layer may be formed of a metal having high thermal conductivity (e.g., Ag, Cu, Al, Au) or an alloy including a main component formed of a metal having high thermal conductivity (e.g., Ag, Cu, Al, Au). For example, with a thermally assisted magnetic recording method, a magnetic layer of a magnetic recording medium is preferred to be cooled after being heated by a laser, so that the heated beam spot can be prevented from enlarging. By providing a heat sink layer, the width of a magnetic transition region and the noise of the magnetic recording medium can be reduced. Thus, it is preferable to form the heat sink layer. Although the position (area) for providing the heat sink layer is not limited in particular, the heat sink layer is preferred to be provided, for example, below the orientation control underlayer or between the orientation control underlayer and the barrier layer.

Further, a soft magnetic underlayer may be formed for improving writing characteristics. Although the material of the soft magnetic underlayer is not limited in particular, the material of the soft magnetic underlayer may be, for example, an amorphous alloy (e.g., CoTaZr, CoFeTaB, CoFeTaSi, CoFeTaZr), a microcrystalline alloy (e.g., FeTaC, FeTaN), or a polycrystalline alloy (e.g., NiFe). The soft magnetic underlayer may be a single film formed of the aforementioned alloys or a multilayer film including antiferromagnetically bonded films having an Ru layer of an appropriate thickness interposed therebetween.

For example, a seed layer or an adhesive layer may also be arbitrarily provided according to necessity.

The magnetic recording medium according to the above-described embodiment of the present invention can be suitably used as a thermally assisted magnetic recording type magnetic recording medium or a microwave assisted magnetic recording type magnetic recording medium.

With the magnetic recording medium according to the above-described embodiment of the present invention, the degree of order of crystal particles of an alloy having an $L1_0$ structure in a magnetic layer can be prevented from degrading by providing a magnetic layer on a predetermined underlayer. Further, by providing the magnetic layer on a predetermined underlayer, the SN ratio of a medium can be increased in a case of using the medium for a magnetic storage apparatus.

Second Embodiment

Next, an example of a configuration of a magnetic storage apparatus 110 according to a second embodiment of the present invention is described. Although this embodiment illustrates an example of a thermally assisted magnetic recording type magnetic storage apparatus, the magnetic storage apparatus may also be a microwave assisted magnetic recording type magnetic storage apparatus.

The magnetic storage apparatus 110 of this embodiment includes the above-described magnetic recording medium 100 of the first embodiment.

As described in detail below, the magnetic storage apparatus 110 includes, for example, a magnetic recording medium drive part for rotating the magnetic recording medium 100 and a magnetic head having a near-field light generating element provided on a distal end of the magnetic head. The magnetic storage apparatus 110 also includes a laser generating part for heating the magnetic recording medium 100, an optical waveguide for guiding a laser beam radiated from the laser generating part, a magnetic head drive part for moving the magnetic head, and a recording/reproduction signal process system.

Next, the configuration of the magnetic storage apparatus 110 is described in detail with reference to FIG. 1.

The magnetic storage apparatus 110 of the second embodiment may have a configuration illustrated in FIG. 1. More specifically, the magnetic storage apparatus 110 may include, for example, the magnetic recording medium 100, a magnetic recording medium drive part 101 for rotating the magnetic recording medium 100, a magnetic head 102, a magnetic head drive part 103 for moving the magnetic head 102, and a recording/reproduction signal process system 104.

Figure 2:
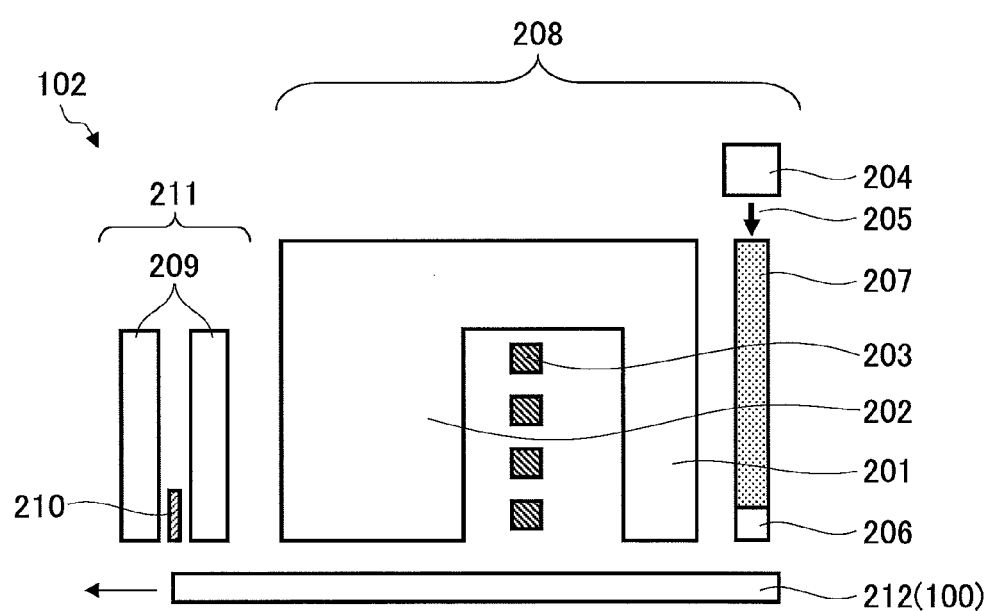
FIG. 2 is a schematic diagram illustrating a configuration of a magnetic head according to an embodiment of the present invention.

The magnetic head 102 may have a configuration illustrated in FIG. 2. The magnetic head 102 includes, for example, a recording head 208 and a reproduction head 211. The recording head 208 includes a main magnetic pole 201, an auxiliary magnetic pole 202, a coil 203 for generating a magnetic field, a laser diode (LD) 204 for serving as a laser generating part, and an optical waveguide 207 for transmitting a laser beam 205 generated from the LD 204 to a near-field light generating element 206. The reproduction head 211 includes a reproduction element 210 sandwiched by a pair of shields 209.

The magnetic recording medium 100 described in the first embodiment is used for the magnetic storage apparatus 110. Therefore, the degree of order of crystal particles of an alloy having an $L1_0$ structure in a magnetic layer can be prevented from degrading by providing a magnetic layer on a predetermined underlayer. Further, by providing the magnetic layer on a predetermined underlayer, the SN ratio of the magnetic recording medium 100 can be increased in a case of using the magnetic recording medium 100 for the magnetic storage apparatus 110. Further, the magnetic storage apparatus 110 can attain a satisfactory recording characteristic (OW (Over-Write) characteristic).

Practical Example

It is to be noted that the following practical examples are for the purpose of illustration and description only and are not to be limitative of the present invention.

First Experimental Example

Practical Examples 1-1 to 1-13, Comparative Examples 1-1 to 1-2

In the first experimental example, samples of the practical examples 1-1 to 1-13 and samples of comparative examples 1-1 to 1-2 are fabricated and evaluated.

Figure 3:
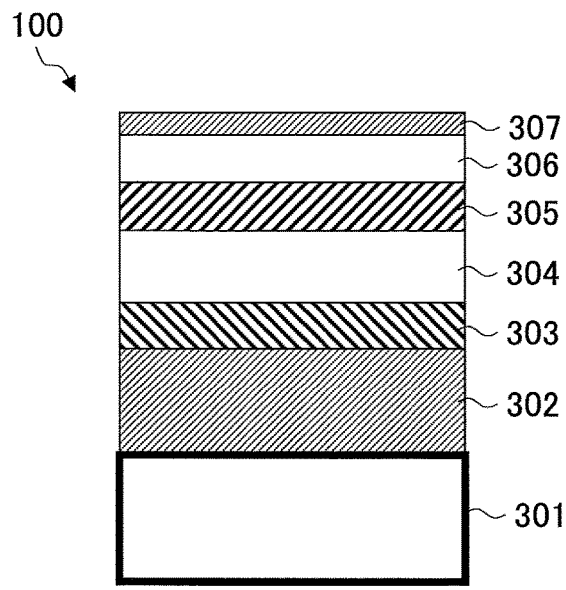
FIG. 3 is a schematic diagram illustrating a cross section of a layer configuration of a magnetic recording medium that is fabricated in a first experimental example.

FIG. 3 is a schematic diagram illustrating a cross section of a layer configuration of a magnetic recording medium that is fabricated in the first experimental example. The processes of fabricating the magnetic recording medium is described below.

In the first experimental example, a seed layer 302 is formed on a glass substrate 301. The size of the glass substrate is 2.5 inches. A Ni-35 at % Ta layer having a film thickness of 25 nm is formed as the seed layer 302. Then, the glass substrate 301 is heated at a temperature of 300° C.

Then, an orientation control underlayer 303 is formed. A Ru-50 at % Al layer having a film thickness of 20 nm is formed as the orientation control underlayer 303.

Then, a crystalline underlayer 304 containing W is formed. The crystalline underlayer 304 has a film thickness of 15 nm.

Then, a barrier layer 305 is formed. A MgO layer having a film thickness of 2 nm is formed as the barrier layer 305.

Then, a magnetic layer 306 is formed. A $SiO_2$ magnetic layer having a film thickness of 8 nm is formed as the magnetic layer 306 by heating the glass substrate 301 at a temperature of 580° C. The composition of the magnetic layer 306 is (Fe-46 at % Pt)-15 mol % $SiO_2$.

As illustrated in the following Table 1, the crystalline underlayer 304 containing W includes layers of different compositions depending on each of the practical examples. In practical example 1-1, the crystalline underlayer 304 includes a W-8 mol % B layer. In practical example 1-2, the crystalline underlayer 304 includes a W-8 mol % Si layer. In practical example 1-3, the crystalline underlayer 304 includes a W-8 mol % C layer. In practical example 1-4, the crystalline underlayer 304 includes a W-8 mol % $B_2O_3$ layer. In practical example 1-5, the crystalline underlayer 304 includes a W-8 mol % $SiO_2$ layer. In practical example 1-6, the crystalline underlayer 304 includes a W-10 mol % $CeO_2$ layer. In practical example 1-7, the crystalline underlayer 304 includes a W-16 mol % TiO layer. In practical example 1-8, the crystalline underlayer 304 includes a W-10 mol % $ZrO_2$ layer. In practical example 1-9, the crystalline underlayer 304 includes a W-10 mol % $Al_2O_3$ layer. In practical example 1-10, the crystalline underlayer 304 includes a W-5 mol % $Y_2O_3$ layer. In practical example 1-11, the crystalline underlayer 304 includes a W-18 mol % NiO layer. In practical example 1-12, the crystalline underlayer 304 includes a (W-20 at % Ta)-5 mol % $Ta_2O_5$ layer. In practical example 1-13, the crystalline underlayer 304 includes a (W-20 at % Cr)-8 mol % $Cr_2O_3$ layer.

In comparative example 1-1, a sample of a W layer is formed without adding B, Si, C or an oxide thereto. In comparative example 1-2, a sample of a W-20 at % Ta layer is formed without adding B, Si, C or an oxide thereto.

According to the results of X-ray diffraction measurement performed on the samples (media) fabricated in the above-described practical and comparative examples, a diffraction peak of the (100) plane and a weak diffraction peak of the (200) plane are observed in the orientation control underlayer (Ru-50 at % Al layer) 303.

Only a diffraction peak of the (200) plane is observed in the crystalline underlayer 304 containing W.

Mixed peaks including a diffraction peak of the (100) plane of $L1_0$-FePt, a diffraction peak of the (002) plane of $L1_0$ FePt, and a diffraction peak of the (200) plane of FCC-FePt are observed in the magnetic layer 306.

Because the barrier layer 305 is a thin layer having a film thickness of 2 nm, no diffraction peak is clearly observed. However, the barrier layer 305 is assumed to have a (100) orientation in view of the orientation of the magnetic layer 306.

Further, no diffraction peak is clearly observed in the seed layer 302. Thus, it can be understood that the seed layer 302 has an amorphous structure.

Table 1 illustrates a ratio of a combined peak strength of a diffraction peak of the (002) plane of $L1_0$-FePt and a diffraction peak of the (200) plane of FCC-FePt ($I_{002}+I_{200}$) with respect to a diffraction peak strength ($I_{001}$) of the (001) plane of the $L1_0$-FePt ($I_{001}/(I_{002}+I_{200})$) Table 1 also illustrates coercivity (Hc) and variance of coercivity ($\Delta Hc/Hc$).

In this first experimental example, "Hc" is obtained by using a SQUID (Superconducting Quantum Interference Device) to measure a magnetization curve in a case of applying a magnetic field of 7 T to a sample at room temperature. Further, "$\Delta Hc/Hc$" is measured by using a method described in "IEEE Trans. Magn., vol. 27, pp. 4975-4977, 1991). More specifically, in a case where Hc distribution is assumed as a Gaussian distribution, "$\Delta Hc/Hc$" is obtained by applying a maximum magnetic field of 7 T to a sample at room temperature, measuring a magnetic field where magnetization becomes 50% of a saturation value in a major loop, measuring a magnetic field where magnetization becomes 50% of a saturation value in a minor loop, and obtaining a difference between the magnetic field in the major loop and the magnetic field in the minor loop. "$\Delta Hc/Hc$" is a parameter that is equivalent to SFD (Switching Field Distribution). That is, the lower the value of $\Delta Hc/Hc$ is the SN ratio of a magnetic recording medium becomes higher in a case where the magnetic recording medium is used for a magnetic storage apparatus. Thus, the value of $\Delta Hc/Hc$ is preferred to be low.

TABLE 1

| | CRYSTALLINE UNDERLAYER CONTAINING W | $I_{001}/(I_{002} + I_{200})$ | Hc (kOe) | $\Delta Hc/Hc$ |
|---|---|---|---|---|
| EXAMPLE 1-1 | W—8 mol % B | 2.17 | 42.0 | 0.28 |
| EXAMPLE 1-2 | W—8 mol % Si | 2.21 | 38.4 | 0.25 |
| EXAMPLE 1-3 | W—8 mol % C | 2.15 | 38.3 | 0.26 |
| EXAMPLE 1-4 | W—8 mol % $B_2O_3$ | 2.21 | 40.0 | 0.27 |
| EXAMPLE 1-5 | W—8 mol % $SiO_2$ | 2.23 | 41.5 | 0.27 |
| EXAMPLE 1-6 | W—10 mol % $CeO_2$ | 2.27 | 40.8 | 0.29 |
| EXAMPLE 1-7 | W—16 mol % TiO | 2.18 | 38.5 | 0.28 |
| EXAMPLE 1-8 | W—10 mol % $ZrO_2$ | 2.27 | 38.8 | 0.29 |
| EXAMPLE 1-9 | W—10 mol % $Al_2O_3$ | 2.23 | 38.6 | 0.27 |

TABLE 1-continued

| | CRYSTALLINE UNDERLAYER CONTAINING W | $I_{001}/(I_{002} + I_{200})$ | Hc (kOe) | Δ Hc/Hc |
|---|---|---|---|---|
| EXAMPLE 1-10 | W—5 mol % $Y_2O_3$ | 2.13 | 41.5 | 0.27 |
| EXAMPLE 1-11 | W—18 mol % NiO | 2.11 | 38.6 | 0.26 |
| EXAMPLE 1-12 | (W—20 at % Ta)—5 mol % $Ta_2O_5$ | 2.12 | 40.6 | 0.26 |
| EXAMPLE 1-13 | (W—20 at % Cr)—8 mol % $Cr_2O_3$ | 2.19 | 39.3 | 0.28 |
| COMPARATIVE EXAMPLE 1-1 | W | 2.22 | 32.3 | 0.36 |
| COMPARATIVE EXAMPLE 1-2 | W—20 at % Ta | 2.27 | 32.3 | 0.35 |

According to the results shown in Table 1, each of the samples of practical examples 1-1 to 1-13 has a coercivity (Hc) of 38 kOe or more. Thus, it is confirmed that the coercivity (Hc) of each of the samples of the practical examples 1-1 to 1-13 is at least 6 kOe higher than the coercivities of the samples of the comparative examples 1-1 and 1-2.

Further, each of the samples of practical examples 1-1 to 1-13 has a variance of coercivity (ΔHc/Hc) of 0.3 or less. Thus, it is confirmed that the variance of coercivity (ΔHc/Hc) of each of the samples of the practical examples 1-1 to 1-13 is lower than those of the samples of the comparative examples 1-1 and 1-2.

Further, the value of "$I_{001}/(I_{002}+I_{200})$" is a high value of 2.1 or more regarding all of the samples of practical examples 1-1 to 1-13 and the samples of comparative examples 1-1 and 1-2. Therefore, the degree of order of the $L1_0$-FePt alloy in the magnetic layer is satisfactory for all of the samples of practical examples 1-1 to 1-13 and the samples of comparative examples 1-1 and 1-2.

According to the above-described results, it is confirmed that the degree of order of the $L1_0$-FePt alloy in the magnetic layer can be maintained by adding B, Si, C, or an oxide to the crystalline underlayer containing W. Further, it is also confirmed that the degree of variance of the $L1_0$-FePt alloy in the magnetic layer can be significantly improved, and that SFD can be reduced.

Second Experimental Example

Practical Examples 2-1 to 2-12, Comparative Example 2-1

Figure 4:
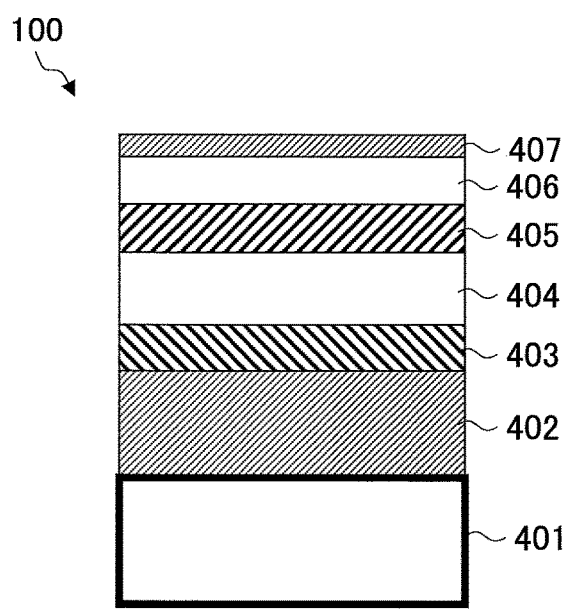
FIG. 4 is a schematic diagram illustrating a cross section of a layer configuration of a magnetic recording medium that is fabricated in a second experimental example.

FIG. 4 is a schematic diagram illustrating a cross section of a layer configuration of a magnetic recording medium that is fabricated in the second experimental example.

In the second experimental example, a seed layer 402 is formed on a glass substrate 401. The size of the glass substrate is 2.5 inches. A Cr-50 at % Ti layer having a film thickness of 25 nm is formed as the seed layer 402. Then, the glass substrate 401 is heated at a temperature of 300° C.

Then, an orientation control underlayer 403 is formed. A Cr-5 at % Mn layer having a film thickness of 20 nm is formed as the orientation control underlayer 403.

Then, a crystalline underlayer 404 containing W is formed. A W-8 mol % $SiO_2$ layer having a film thickness of 20 nm is formed as the crystalline underlayer 404.

Then, a barrier layer 405 is formed. The barrier layer 405 includes layers of different compositions depending on the corresponding practical examples. As illustrated in the following Table 2, the barrier layer 405 of practical example 2-1 includes a MgO layer; the barrier layer 405 of practical example 2-2 includes a TiO layer; the barrier layer 405 of practical example 2-3 includes a NiO layer; the barrier layer 405 of practical example 2-4 includes a TiN layer; the barrier layer 405 of practical example 2-5 includes a TiC layer; the barrier layer 405 of practical example 2-6 includes a TaN layer; the barrier layer 405 of practical example 2-7 includes a HfN layer; the barrier layer 405 of practical example 2-8 includes a NbN layer; the barrier layer 405 of practical example 2-9 includes a ZrC layer; the barrier layer 405 of practical example 2-10 includes a HfC layer; the barrier layer 405 of practical example 2-11 includes a NbC layer; and the barrier layer 405 of practical example 2-12 includes a TaC layer. Further, the sample of comparative example 2-1 is formed without a barrier layer.

Then, a magnetic layer 406 is formed. A $SiO_2$ magnetic layer having a film thickness of 10 nm is formed as the magnetic layer 406 by heating the glass substrate 401 at a temperature of 600 The composition of the magnetic layer 406 is (Fe-45 at % Pt)-12 mol % $SiO_2$— 6 mol % BN. Then, a DLC protection layer 407 having a film thickness of 3 nm is formed.

TABLE 2

| | BARRIER LAYER | Hc (kOe) | Δ Hc/Hc |
|---|---|---|---|
| EXAMPLE 2-1 | MgO | 41.1 | 0.27 |
| EXAMPLE 2-2 | TiO | 38.5 | 0.27 |
| EXAMPLE 2-3 | NiO | 39.6 | 0.27 |
| EXAMPLE 2-4 | TiN | 41.4 | 0.28 |
| EXAMPLE 2-5 | TiC | 39.7 | 0.28 |
| EXAMPLE 2-6 | TaN | 38.9 | 0.27 |
| EXAMPLE 2-7 | HfN | 38.7 | 0.25 |
| EXAMPLE 2-8 | NbN | 38.4 | 0.29 |
| EXAMPLE 2-9 | ZrC | 38.3 | 0.27 |
| EXAMPLE 2-10 | HfC | 38.2 | 0.28 |
| EXAMPLE 2-11 | NbC | 38.3 | 0.26 |
| EXAMPLE 2-12 | TaC | 40.3 | 0.26 |
| COMPARATIVE EXAMPLE 2-1 | — | 19.0 | 0.38 |

Similar to the first experimental example, the results of measuring the coercivity (Hc) and the variance of coercivity (ΔHc/Hc) are illustrated in Table 2.

According to the results shown in Table 2, each of the samples of practical examples 2-1 to 2-12 has a high coercivity (Hc) of 38 kOe or more, and a low coercivity variance (ΔHc/Hc) of 0.3 or less.

Particularly, among the samples of the practical examples, the sample of practical example 2-1 having a MgO layer as its barrier layer 405, the sample of practical example 2-4 having a TiN layer as its barrier layer 405, and the sample of practical example 2-12 having a TaC layer as its barrier layer 405 are confirmed to have a high coercivity (Hc) of 40 kOe or more.

On the other hand, the sample of comparative example 2-1 having no barrier layer 405 is confirmed to have a low coercivity (Hc) of 20 kOe or less and a higher coercivity variance (ΔHc/Hc) of 0.38. For the purpose of promoting the ordering of the magnetic layer having a L1$_0$ structure, a substrate of the comparative example 2-1 is heated at 600° C. in the process of forming the magnetic layer. The reason for the low coercivity and the high coercivity variance of sample of the comparative example 2-1 is because the magnetic layer cannot sufficiently function (perform) due to interfacial diffusion generated between the underlayer and the magnetic layer during the process of forming the magnetic layer.

According to the above-described results, it is confirmed that a barrier layer including a material having a NaCl structure is preferred to be provided between the underlayer and the magnetic layer, so that interfacial diffusion is prevented from being generated between an underlayer and a magnetic layer when heating a substrate during the process of forming the magnetic layer that exhibits a satisfactory degree of order and has an alloy having a L1$_0$ structure as its main component.

Third Experimental Example

Practical Examples 3-1 to 3-6, Comparative Example 3-1

As illustrated in the following Table 3, except for the aspect that the crystalline underlayer 404 containing W is a (W-20 at % Ta)—SiO$_2$ layer to which 0.5 mol % to 26.5 mol % of SiO$_2$ is added, a magnetic recording medium having the same film structure as that of practical example 2-12 is fabricated.

Further, a sample (medium) of comparative example 3-1 is fabricated by forming the crystalline underlayer 404 containing W as a W-20 at % Ta layer with no SiO$_2$ added thereto.

Other than the composition of the crystalline underlayer containing W, the layer configuration and depositing process of the practical and comparative examples of the third experimental example are the same as those of the second experimental example.

Table 3 illustrates the results of measuring coercivity (Hc) of each of the samples of practical examples 3-1 to 3-6 and comparative example 3-1.

underlayer containing W (practical examples 3-2 to 3-6) has a high coercivity (Hc) of 39 kOe or more.

The effect of adding SiO$_2$ to the crystalline underlayer containing W can also be confirmed for practical example 3-1 (with 0.5 mol % of SiO$_2$ added) and practical example 3-6 (with 26.5 mol % of SiO$_2$ added) in comparison with comparative example 3-1. However, compared to the other practical examples, practical examples 3-1 and 3-6 have coercivities (Hc) of approximately 35 kOe and exhibit a slightly lower performance compared to those of the other practical examples. This is because, in a case where the added amount of SiO$_2$ is 0.5 mol %, the particle diameter of the particles of the crystalline underlayer containing W cannot be sufficiently reduced, and the L1$_0$-FePt alloy particles of the magnetic layer cannot be sufficiently separated. Further, in a case where the added amount of SiO$_2$ is 26.5 mol %, the orientation of the crystalline underlayer containing W with respect to the (100) plane is degraded.

According to the results of Table 3, it is preferable to add 0.5 mol % or more to 26.5 mol % or less of SiO$_2$ to the crystalline underlayer containing W. More preferably, the added amount of SiO$_2$ is more than 0.5 mol % but less than 26.5 mol %. In a case of expressing the added oxide amount of Table 3 in units of vol %, it is preferable to add 1 vol % or more to 50 vol % or less of SiO$_2$ to the crystalline underlayer containing W. More preferably, the added amount of SiO$_2$ is more than 1 vol % but less than 50 vol %.

Although the third experimental example is performed using SiO$_2$, it is assumed that similar effects can be attained even in a case where an oxide besides SiO$_2$ is used. Therefore, in a case of adding an oxide besides SiO$_2$, it is preferable to add 1 vol % or more to 50 vol % or less of the oxide to the crystalline underlayer containing W.

Fourth Experimental Example

Practical Examples 4-1 to 4-5, Comparative Example 4-1

As illustrated in the following Table 4, except for the aspect that the crystalline underlayer 404 containing W is a W—B layer to which 1 mol % to 20 mol % of B is added,

TABLE 3

| | CRYSTALLINE UNDERLAYER CONTAINING W | AMOUNT OF SiO$_2$ IN CRYSTALLINE UNDERLAYER CONTAINING W (CALCULATED VALUE) (vol %) | Hc (kOe) |
|---|---|---|---|
| EXAMPLE 3-1 | (W—20 at % Ta)—0.5 mol % SiO$_2$ | 1 | 35.8 |
| EXAMPLE 3-2 | (W—20 at % Ta)—5 mol % SiO$_2$ | 13 | 40.4 |
| EXAMPLE 3-3 | (W—20 at % Ta)—10 mol % SiO$_2$ | 24 | 40.7 |
| EXAMPLE 3-4 | (W—20 at % Ta)—15 mol % SiO$_2$ | 33 | 41.9 |
| EXAMPLE 3-5 | (W—20 at % Ta)—20 mol % SiO$_2$ | 41 | 39.7 |
| EXAMPLE 3-6 | (W—20 at % Ta)—26.5 mol % SiO$_2$ | 50 | 35.3 |
| COMPARATIVE EXAMPLE 3-1 | W—20 at % Ta | — | 30.9 |

According to the results of Table 3, it is confirmed that each of the samples of practical examples 3-1 to 3-6 has a coercivity (Hc) of 38 kOe or more, and the performance of each of the samples of practical examples 3-1 to 3-6 is improved compared to the sample of comparative example 3-1 to which no SiO$_2$ is added. From the results of Table 3, it can be understood that 0.5 mol % or more to 26.5 mol % or less of SiO$_2$ is preferred to be added to W of the crystalline underlayer containing W.

Particularly, it is confirmed that each of the samples having 5 mol % to 20 mol % of SiO$_2$ added to the crystalline a magnetic recording medium having the same film structure as that of practical example 2-1 is fabricated.

Further, a sample (medium) of comparative example 4-1 is fabricated by forming the crystalline underlayer 404 containing W as a W layer with no B added thereto.

Other than the composition of the crystalline underlayer containing W, the layer configuration and depositing process of the practical and comparative examples of the fourth experimental example are the same as those of the second experimental example.

Table 4 illustrates the results of measuring coercivity (Hc) of each of the samples of practical examples 4-1 to 4-6 and comparative example 4-1.

TABLE 4

|  | CRYSTALLINE UNDERLAYER CONTAINING W | Hc (kOe) |
|---|---|---|
| EXAMPLE 4-1 | W—1 mol % B | 36.7 |
| EXAMPLE 4-2 | W—5 mol % B | 41.5 |
| EXAMPLE 4-3 | W—10 mol % B | 40.7 |
| EXAMPLE 4-4 | W—15 mol % B | 39.8 |
| EXAMPLE 4-5 | W—20 mol % B | 35.8 |
| COMPARATIVE EXAMPLE 4-1 | W | 32 |

According to the results of Table 4, it is confirmed that each of the samples of practical examples 4-1 to 4-5 has a coercivity (Hc) of 35 kOe or more, and the performance of each of the samples of practical examples 4-1 to 4-5 is improved compared to the sample of comparative example 4-1 to which no B is added. From the results of Table 4, it can be understood that 1 mol % or more to 20 mol % or less of B is preferred to be added to W of the crystalline underlayer containing W.

Particularly, it is confirmed that each of the samples having 5 mol % to 15 mol % of B added to the crystalline underlayer containing W (practical examples 4-2 to 4-4) has a high coercivity (Hc) of 39 kOe or more.

The effect of adding B to the crystalline underlayer containing W can also be confirmed for practical example 4-1 (added with 1 mol % of B) and practical example 4-6 (added with 20 mol % of B) in comparison with comparative example 4-1. However, compared to the other practical examples, practical examples 3-1 and 3-6 exhibit a slightly lower performance compared to those of the other practical examples. This is because, in a case where the added amount of B is 1 mol %, the particle diameter of the particles of the crystalline underlayer containing W cannot be sufficiently reduced, and the $L1_0$-FePt alloy particles of the magnetic layer cannot be sufficiently separated. Further, in a case where the added amount of B is 20 mol %, the orientation of the crystalline underlayer containing W with respect to the (100) plane is degraded.

According to the results of Table 4, it is preferable to add 1 mol % or more to 20 mol % or less of B to the crystalline underlayer containing W. More preferably, the added amount of B is more than 1 mol % but less than 20 mol %.

Although the fourth experimental example is performed using B, it is assumed that similar effects can be attained even in a case where aforementioned elements (Si, C) besides B are used. Therefore, in a case of adding one or more kinds of elements selected from B, Si, and C, it is preferable to add 1 mol % or more to 20 mol % or less of the one or more kinds of elements selected from B, Si, and C to the crystalline underlayer containing W. More preferably, the added amount of the one or more kinds of elements selected from B, Si, and C is more than 1 mol % but less than 20 mol %.

Fifth Experimental Example

Practical Examples 5-1 to 5-11, Comparative Examples 5-1 to 5-2

Figure 5:
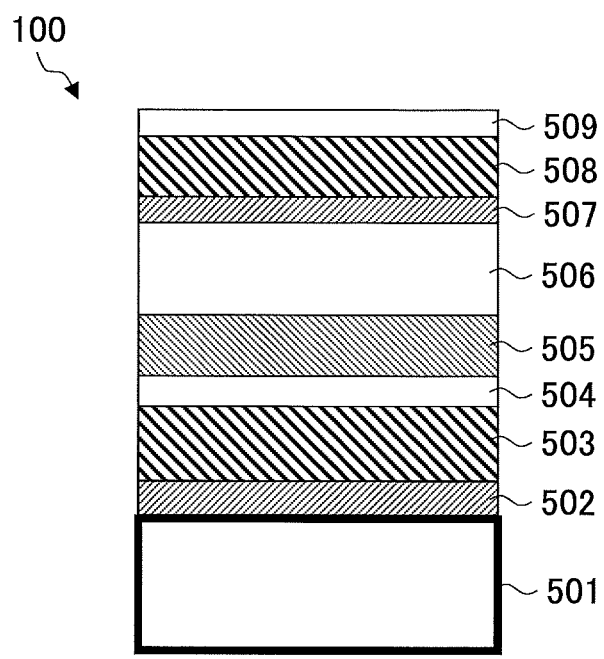
FIG. 5 is a schematic diagram illustrating a cross section of a layer configuration of a magnetic recording medium that is fabricated in a fifth experimental example.

FIG. 5 is a schematic diagram illustrating a cross section of a layer configuration of a magnetic recording medium that is fabricated in the fifth experimental example.

In the fifth experimental example, an adhesive layer 502 is formed on a glass substrate 501. The size of the glass substrate 501 is 2.5 inches. A Cr-50 at % Ti layer having a film thickness of 10 nm is formed as the adhesive layer 502. Then, a heat sink layer 503 is formed on the adhesive layer 502. A Cu-0.5 at % Zr layer having a film thickness of 50 nm is formed as the heat sink layer 503. Then, a seed layer 504 is formed on the heat sink layer 503. A Cr-50 at % Ti layer having a film thickness of 10 nm is formed as the seed layer 504. Then, the glass substrate 501 is heated at a temperature of 300° C.

Then, an orientation control underlayer 505 is fondled. A Cr-10 at % Ru layer having a film thickness of 10 nm is formed as the orientation control underlayer 505.

Then, a crystalline underlayer 506 containing W is formed. The crystalline underlayer 506 has a film thickness of 15 nm.

Then, a barrier layer 507 is formed. A MgO layer having a film thickness of 2 nm is formed as the barrier layer 507.

Then, a magnetic layer 508 is formed. A layer having a film thickness of 8 nm is formed as the magnetic layer 508 by heating the glass substrate 501 at a temperature of 600° C. The composition of the magnetic layer 306 is (Fe-46 at % Pt)-30 mol % C. Then, a DLC protection film 509 having a film thickness of 3 nm is formed.

As illustrated in the following Table 5, the crystalline underlayer 506 containing W includes layers of different composition depending on each of the practical examples. In practical example 5-1, the crystalline underlayer 506 includes a W-8 mol % B layer. In practical example 5-2, the crystalline underlayer 506 includes a W-8 mol % Si layer. In practical example 5-3, the crystalline underlayer 506 includes a (W-15 at % Ti)-11 mol % $TiO_2$ layer. In practical example 5-4, the crystalline underlayer 506 includes a W-8 mol % $SiO_2$ layer. In practical example 5-5, the crystalline underlayer 506 includes a (W-10 at % Ta)-10 mol % $ZrO_2$ layer. In practical example 5-6, the crystalline underlayer 506 includes a W-4 mol % $Nb_2O_5$ layer. In practical example 5-7, the crystalline underlayer 506 includes a W-4.5 mol % $La_2O_3$ layer. In practical example 5-8, the crystalline underlayer 506 includes a W-17 mol % CoO layer. In practical example 5-9, the crystalline underlayer 506 includes a W-16 mol % FeO. In practical example 5-10, the crystalline underlayer 506 includes a (W-15 at % Cr)-16 mol % MnO layer. In practical example 5-11, the crystalline underlayer 506 includes a W-14 mol % ZnO layer. Further, a sample of a crystalline underlayer containing W of comparative example 5-1 is a W layer formed without adding B, Si, C or an oxide thereto, and a sample of a crystalline underlayer containing W of comparative example 5-2 is a W-20 at % Ta layer.

Then, a lubricant formed of a perfluoropolyether type fluororesin is applied to on the surface of each of magnetic recording media of the practical and comparative examples. Then, each of the magnetic recording media of the practical and comparative examples is installed in a corresponding magnetic storage apparatus 110 illustrated in FIG. 1.

As described above, the magnetic storage apparatus 110 includes the magnetic recording medium 100, the magnetic recording medium drive part 101 for rotating the magnetic recording medium 100, the magnetic head 102, the magnetic head drive part 103 for moving the magnetic head 102, and the recording/reproduction signal process system 104.

Then, evaluation of the OW (Over-Write) characteristic is performed by using the magnetic head 102 as illustrated in FIG. 2. The magnetic head 102 used in the fifth experimental example includes the recording head 208 and the reprodution head 211. The recording head 208 includes the main magnetic pole 201, the auxiliary magnetic pole 202, the coil 203 for generating a magnetic field, the laser diode (LD) 204, and the optical waveguide 207 for transmitting the laser beam 205 generated from the LD 204 to the near-field light generating element 206. The reproduction head 211 includes the reproduction element 210 sandwiched by a pair of shields 209.

Recording is performed on the magnetic recording medium 100 (212) by heating the magnetic recording medium 100 with a near-field light generated by the near-field light generating element 206 and lowering the value of the coercivity of the magnetic recording medium 100 to a value equal to or less than the magnetic field of the magnetic head 102.

The following Table 5 illustrates the measured SN ratios and OW (Over-Write) characteristics of magnetic recording media in a case where the magnetic head 102 of the magnetic storage apparatus 110 is used to record single pattern signals with a linear recording density of 1500 k FCI (Flux Changes per Inch). The power supplied to the laser diode 204 is adjusted, so that the track width (Magnetic Write Width, MWW), which is defined to be half the width of the track profile, becomes 60 nm.

TABLE 5

|  | CRYSTALLINE UNDERLAYER CONTAINING W | MEDIUM SN RATIO (dB) | OW (dB) |
|---|---|---|---|
| EXAMPLE 5-1 | W—8 mol % B | 15.1 | 32.9 |
| EXAMPLE 5-2 | W—8 mol % Si | 16.2 | 33.4 |
| EXAMPLE 5-3 | (W—15 at % Ti)—11 mol % $TiO_2$ | 15.9 | 34.9 |
| EXAMPLE 5-4 | W—8 mol % $SiO_2$ | 16.4 | 34 |
| EXAMPLE 5-5 | (W—10 at % Ta)—10 mol % $ZrO_2$ | 15.6 | 34.7 |
| EXAMPLE 5-6 | W—4 mol % $Nb_2O_5$ | 15.7 | 34.5 |
| EXAMPLE 5-7 | W—4.5 mol % $La_2O_3$ | 15.3 | 33 |
| EXAMPLE 5-8 | W—17 mol % CoO | 16.4 | 32.8 |
| EXAMPLE 5-9 | W—16 mol % FeO | 15.2 | 33.7 |
| EXAMPLE 5-10 | (W—15 at % Cr)—16 mol % MnO | 15.6 | 32.7 |
| EXAMPLE 5-11 | W—14 mol % ZnO | 15.9 | 32.8 |
| COMPARATIVE EXAMPLE 5-1 | W | 13.1 | 27.1 |
| COMPARATIVE EXAMPLE 5-2 | W—20 at % Ta | 13.2 | 25.7 |

Each of the samples of practical examples 5-1 to 5-11 has a high SN ratio of 15 dB or more and exhibits a high OW characteristic of 30 dB or more. Particularly, the sample of practical example 5-2 that uses a W-8 mol % Si layer as the crystalline underlayer containing W, the sample of practical example 5-4 that uses a W-8 mol % $SiO_2$ layer as the crystalline underlayer containing W, and the sample of practical example 5-8 that uses a W-17 mol % CoO layer as the crystalline underlayer containing W exhibit a high SN ratio of 16 dB or more, respectively.

On the other hand, the sample of comparative example 5-1 that uses a W layer as the crystalline underlayer containing W and the sample of comparative example 5-2 that uses a W-20 at % Ta layer as the crystalline underlayer containing W exhibit significantly low SN ratios and OW characteristics compared to the practical examples.

Hence, it is understood that a magnetic storage apparatus having a high SN ratio and a satisfactory OW characteristic can be obtained by using a magnetic recording medium that includes a crystalline underlayer containing W and including B, Si, C or an oxide.

With the above-described embodiments of the present invention, a magnetic recording medium, which includes a magnetic layer containing alloy crystal particles having an $L1_0$ structure, can be provided without degrading the degree of order of the alloy crystal particles. Further, in a case of using the magnetic recording medium for a magnetic storage apparatus, the magnetic recording medium can attain a high SN ratio.

Further, the present invention is not limited to these practical examples, but various variations and modifications may be made without departing from the scope of the present invention.

What is claimed is:
1. A magnetic recording medium comprising:
a substrate;
a plurality of underlayers formed on the substrate; and
a magnetic layer formed on the plurality of underlayers;
wherein a main component of the magnetic layer is an alloy having a $L1_0$ structure,
wherein at least one of the plurality of underlayers is a crystalline underlayer containing W,
wherein the W is a main component of the crystalline underlayer,
wherein the W contained in the crystalline underlayer is 80 at % or more,
wherein the crystalline underlayer further contains 1 mol % or more to 20 mol % or less of one or more kinds of elements selected from B, Si, and C,
wherein a barrier layer including a material having a NaCl structure is formed between the crystalline underlayer and the magnetic layer.
2. The magnetic recording medium as claimed in claim 1, further comprising:
an orientation control underlayer including one or more kinds of metal selected from Cr, an alloy having a BCC structure and including Cr as a main component, and an alloy having a B2 structure;
wherein the crystalline underlayer is formed on the orientation control underlayer.
3. The magnetic recording medium as claimed in claim 1, wherein the material having a NaCl structure includes one or more kinds of compounds selected from MgO, TiO, NiO, TiN, TiC, TaN, HfN, NbN, ZrC, HfC, TaC, and NbC.
4. The magnetic recording medium as claimed in claim 1, wherein the magnetic layer includes one or more kinds of substances selected from $SiO_2$, $TiO_2$, $Cr_2O_3$, $Al_2O_3$, $Ta_2O_5$, $ZrO_2$, $Y_2O_3$, $CeO_2$, MnO, TiO, ZnO, $B_2O_3$, C, B, and BN, wherein a main component of the magnetic layer is a FePt alloy having a $L1_0$ structure or a CoPt alloy.

5. A magnetic storage apparatus comprising:
the magnetic recording medium of claim 1.

* * * * *